United States Patent
Miyoshi et al.

(10) Patent No.: US 12,379,622 B2
(45) Date of Patent: Aug. 5, 2025

(54) DISPLAY APPARATUS

(71) Applicant: Yazaki Corporation, Tokyo (JP)

(72) Inventors: Yuki Miyoshi, Makinohara (JP);
Yasuhiro Katsumata, Makinohara (JP);
Akira Yamanaka, Makinohara (JP);
Hiroshi Sano, Makinohara (JP);
Takuya Ishigami, Shimada (JP);
Takahiro Osawa, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 14 days.

(21) Appl. No.: 18/631,153

(22) Filed: Apr. 10, 2024

(65) Prior Publication Data

US 2024/0377675 A1     Nov. 14, 2024

(30) Foreign Application Priority Data

May 12, 2023 (JP) ................ 2023-078962

(51) Int. Cl.
*G02F 1/1333* (2006.01)
*B60K 35/231* (2024.01)
*G02F 1/1335* (2006.01)

(52) U.S. Cl.
CPC ...... *G02F 1/133382* (2013.01); *B60K 35/231* (2024.01); *G02F 1/133504* (2013.01)

(58) Field of Classification Search
CPC ......... G02F 1/133382; G02F 1/133504; G02F 1/133385; H05K 7/20963; H05K 1/0204

USPC ......................................................... 349/161
See application file for complete search history.

(56) References Cited

U.S. PATENT DOCUMENTS

| | | | |
|---|---|---|---|
| 2016/0187567 A1* | 6/2016 | Zhou ...................... | G02B 6/005 362/606 |
| 2016/0351144 A1* | 12/2016 | Park ................... | G02F 1/133514 |
| 2020/0004067 A1* | 1/2020 | Hada .................... | G03B 21/006 |
| 2020/0196492 A1* | 6/2020 | Kim ................... | G02F 1/133308 |

FOREIGN PATENT DOCUMENTS

JP         2020-189626 A     11/2020

* cited by examiner

*Primary Examiner* — Jonathan Y Jung
(74) *Attorney, Agent, or Firm* — Sughrue Mion, PLLC

(57) ABSTRACT

A display apparatus includes a light source, a display unit in a plate shape including a display area on which light emitted by the light source is focused, a heat dissipation portion in a plate shape arranged on one side or another side in a plate thickness direction of the display unit, a housing containing the display unit and the heat dissipation portion, a first fixing portion provided on the housing to sandwich and fix the display unit and the heat dissipation portion in a plane extension direction intersecting the plate thickness direction, and a second fixing portion that limits displacement of the display unit and the heat dissipation portion by collectively pressing the display unit and the heat dissipation portion in the plate thickness direction.

7 Claims, 7 Drawing Sheets

DISPLAY APPARATUS

TECHNICAL FIELD

The present invention relates to a display apparatus.

BACKGROUND

Conventionally, display devices are known that project display light emitted from a light source onto a transparent member such as a windshield of a vehicle (for example, see Patent Document 1). The display apparatus described in the Patent Document 1 includes a backlight unit constituted by a light source and multiple lenses and a liquid crystal display device (display unit) in a plate shape including a display area on which the light emitted by the light source is focused. The liquid crystal display device is protected by a frame-shaped cover with its display area being visible, and is fixed to a container portion in a box shape by a hook formed on the cover.

RELATED ART

Patent Document

Patent Document 1: JP 2020189626 (A)

SUMMARY OF THE INVENTION

Problem to be Solved by the Invention

However, in the display apparatus described above, the temperature of the liquid crystal display device may rise due to the effects of conductive heat caused by voltage application during startup and focused-light heat caused by display light (also, focused-light heat caused by outside light, if the display apparatus is a head-up display (HUD) mounted on a vehicle). Therefore, there is a risk of expansion or damage of the liquid crystal display device. Regarding this point, it is conceivable to insert a plate glass or the like between the liquid crystal display device and the container portion to dissipate the above-mentioned conductive heat and the like through the plate glass. However, in a case where the display apparatus is used in a vehicle and the like, the container portion of the liquid crystal display device vibrates, so that the plate glass and the liquid crystal display device vibrate in the plane extension direction and the plate thickness direction, which results in abnormal noises. In addition, it is difficult to keep the plate glass and the liquid crystal display device in contact with each other due to vibration, and there was a possibility that the heat dissipation efficiency of the plate glass would decrease.

It is an object of the present invention is to obtain a display apparatus with improved heat dissipation performance and improved vibration resistance.

Solution to Problem

In order to solve the above problems and achieve the object, according to an aspect of the present invention, a display apparatus includes a light source, a display unit in a plate shape including a display area on which light emitted by the light source is focused, a heat dissipation portion in a plate shape arranged on one side or another side in a plate thickness direction of the display unit, a housing containing the display unit and the heat dissipation portion, a first fixing portion provided on the housing to sandwich and fix the display unit and the heat dissipation portion in a plane extension direction intersecting the plate thickness direction, and a second fixing portion that limits displacement of the display unit and the heat dissipation portion by pressing the display unit and the heat dissipation portion together in the plate thickness direction.

Advantageous Effects of the Invention

According to an aspect of the present invention, a display apparatus with improved heat dissipation performance and improved vibration resistance can be obtained.

DETAILED DESCRIPTION OF THE EXEMPLARY EMBODIMENT

Figure 1:
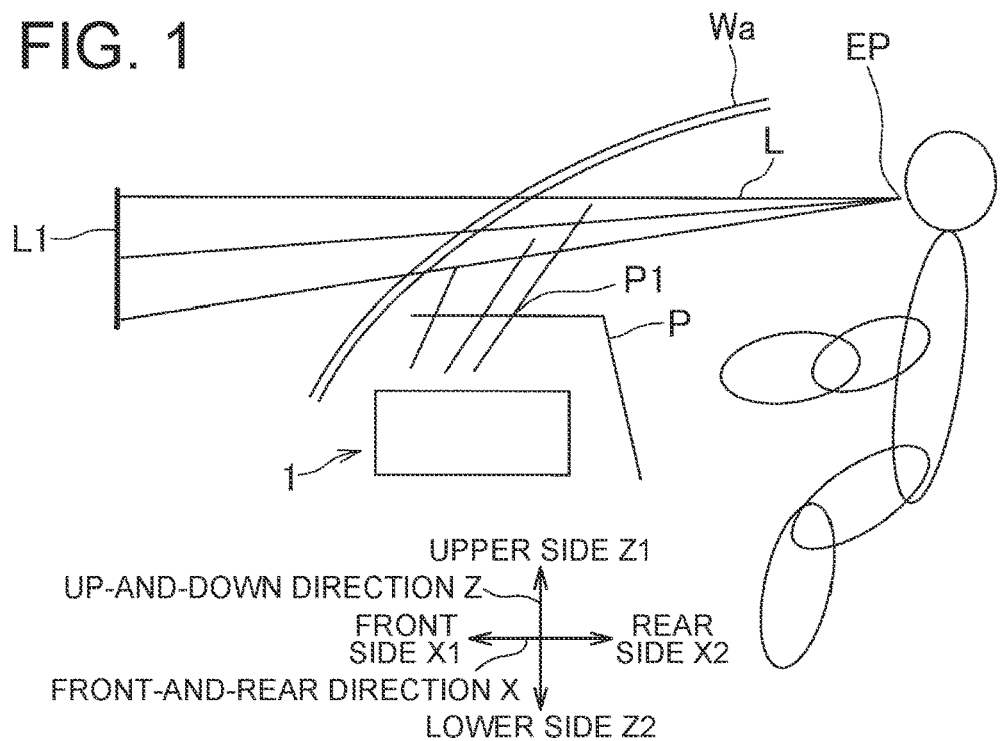
FIG. 1 is an overall schematic view of a display apparatus according to an embodiment of the present invention arranged in a vehicle.

An embodiment of the present invention is described below with reference to FIG. 1 to FIG. 6A. A display apparatus 1 is a head-up display unit (HUD unit) mounted on a vehicle or the like. As illustrated in FIG. 1, the display apparatus 1 is provided inside an instrument panel P on the front side of the vehicle.

The display apparatus 1 emits display light L to a windshield Wa through an emission port P1 that is open in the instrument panel P to generate a predetermined display image by a virtual image L1 displaced at a distance. The display image by the virtual image L1 illustrates various information such as speed, mileage, and the like, and the driver who is driving the vehicle checks this various information while the driver sees forward from an eyepoint Ep indicating the position of the eyes. Specifically, the driver simultaneously sees, in an overlapping manner, a display image generated by the display apparatus 1 and a scenery in front of the vehicle that can be seen through the windshield Wa.

In the drawings, an arrow X, an arrow Y, and an arrow Z are directions perpendicular to each other. In the present embodiment, a front-and-rear direction of a vehicle is indicated by an arrow X, and is referred to as a "front-and-rear direction X". In the front-and-rear direction X, a front side is referred to as a "front side X1", and a rear side is referred to as a "rear side X2". A width direction of a vehicle is indicated by an arrow Y, and is referred to as a "width direction Y". A height direction of a vehicle is indicated by an arrow Z, and is referred to as an "up-and-down direction Z". In the up-and-down direction Z, an upper side is referred to as an "upper side Z1", and a lower side is referred to as a "lower side Z2". The plate thickness direction of the display unit 132 explained later may be referred to as a plate thickness direction or a buffer member push direction c. A direction intersecting the plate thickness direction may be referred to as a plane extension direction or a display unit angle direction d. This is for convenience of explanation, and is not intended to limit the direction of the display apparatus 1 during manufacturing and the direction of the display apparatus 1 in actual use.

Figure 2:
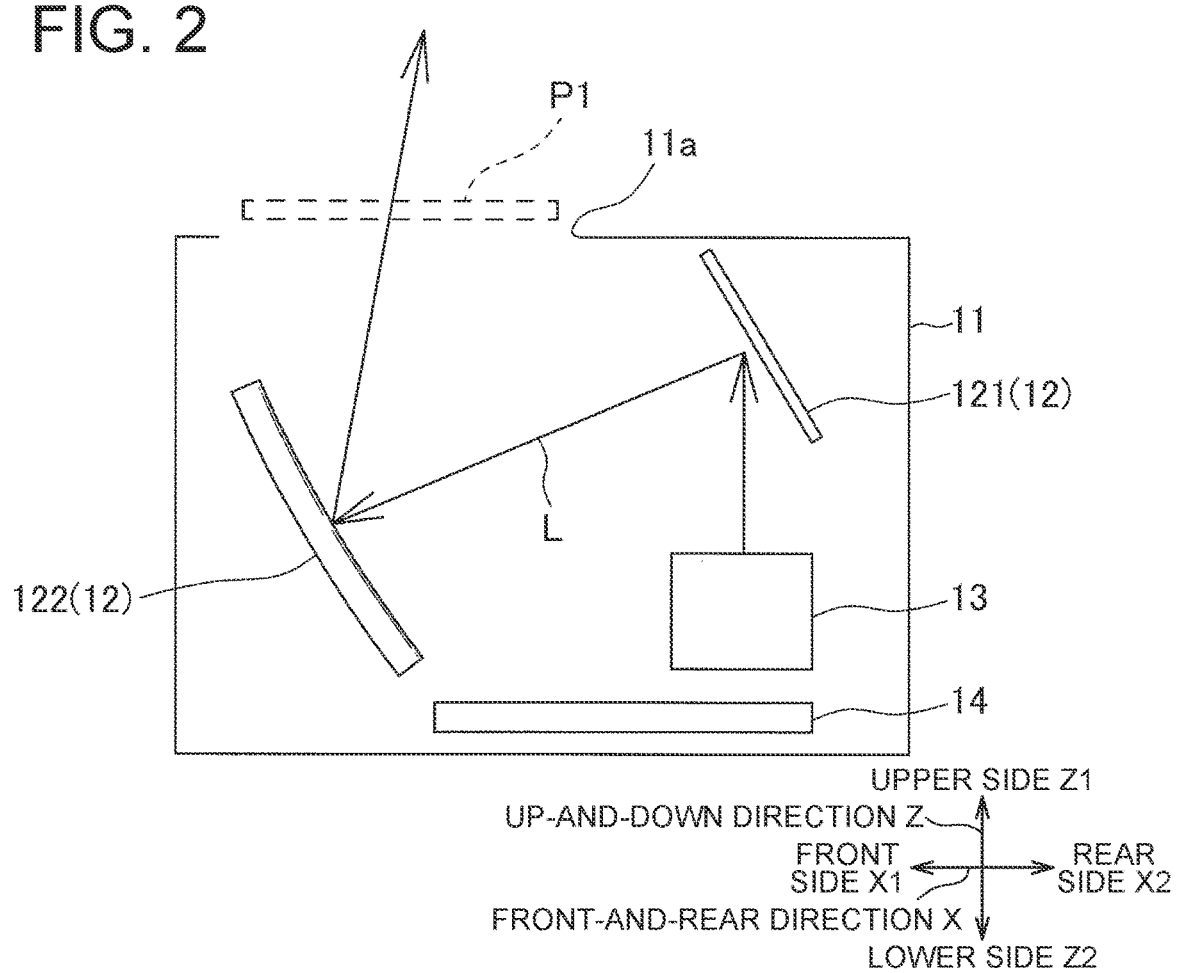
FIG. 2 is an overall schematic view illustrating a configuration of a display apparatus.

As illustrated in FIG. 2, the display apparatus 1 includes a housing 11, a mirror component 12, a backlight device 13, and a control circuit board 14.

The housing 11 is arranged inside the instrument panel P to contain various configurations of the display apparatus 1. An opening 11a in communication with the emission port P1 of the instrument panel P is formed in the upper part of the housing 11.

The mirror component 12 includes a flat mirror 121 arranged on the upper side Z1 of the backlight device 13 and a concave mirror 122 arranged on the front side X1 of the backlight device 13 to oppose the flat mirror 121. The flat mirror 121 is a reflection member for initially reflecting the display light L emitted from the backlight device 13, and reflects the display light L toward the diagonally lower side. The concave mirror 122 is a reflection member for reflecting the display light L reflected by the flat mirror 121, and reflects the display light L toward the upper side Z1 (toward the wind shield Wa).

Figure 3:
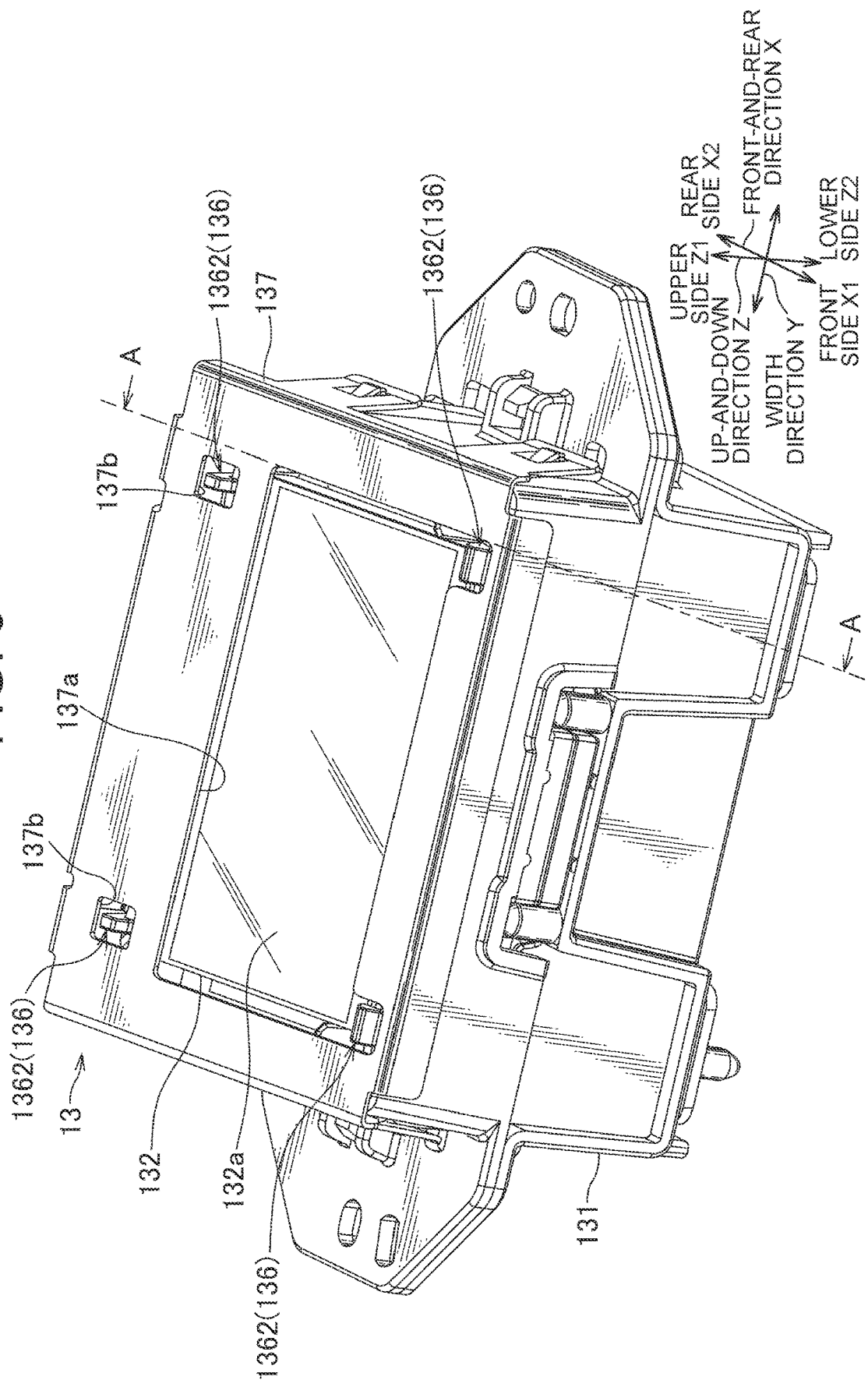
FIG. 3 is a perspective view of a backlight device constituting a portion of the display apparatus.
Figure 4:
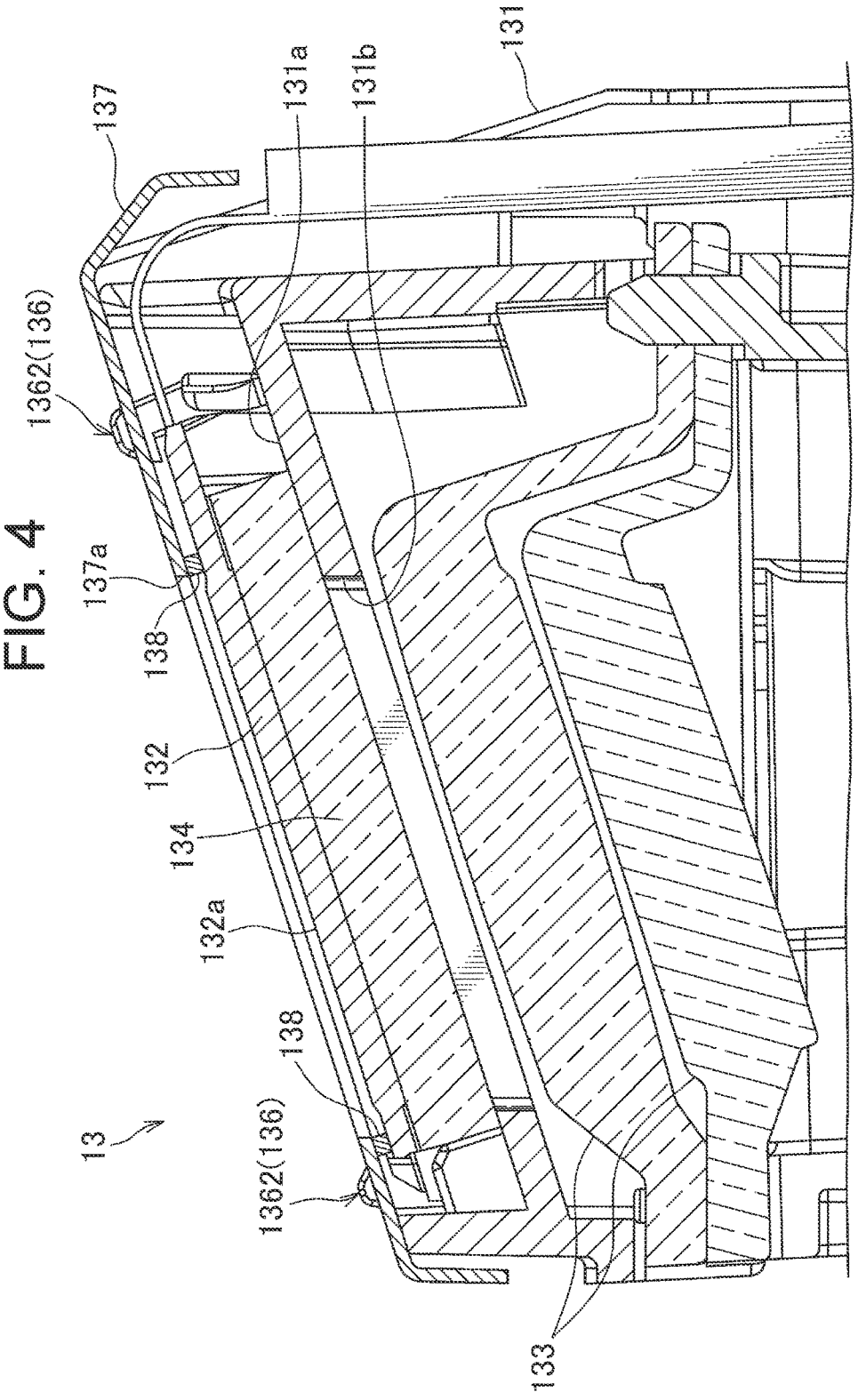
FIG. 4 is a cross-sectional view taken along the A-A line of FIG. 3.

As illustrated in FIGS. 3 and 4, the backlight device 13 includes a backlight housing 131 (housing), a light source, not illustrated, a display unit 132, optical lenses 133, a heat dissipation portion 134, resin springs 136 (first fixing portion), a backlight cover 137 (cover member), and buffer members 138.

The backlight housing 131 is a container member for containing the display unit 132, the heat dissipation portion 134, and the like, and is formed in a box shape as illustrated in FIG. 3. The backlight housing 131 is constituted by a resin member with heat dissipation property.

Figure 5:
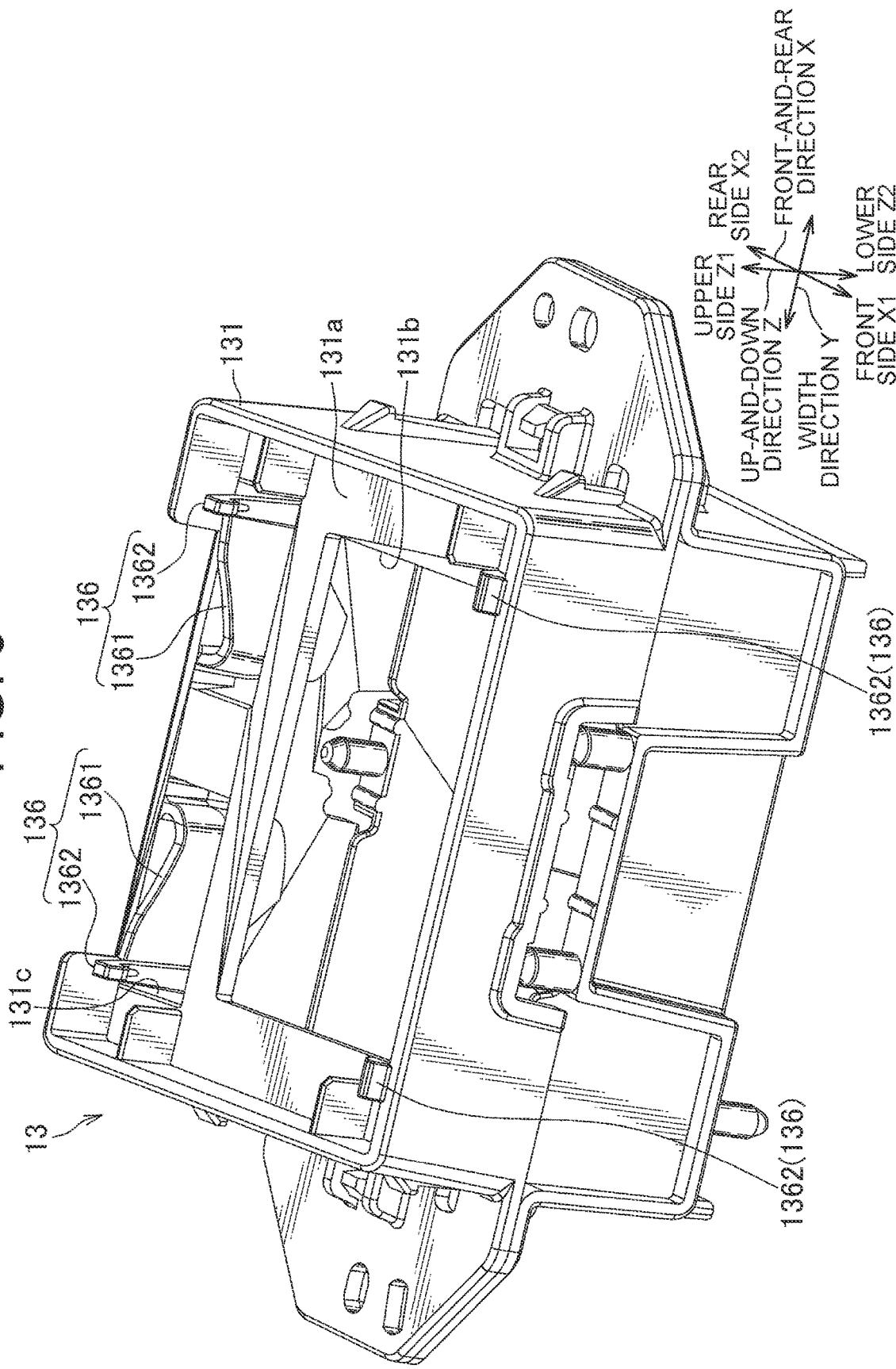
FIG. 5 is a perspective view of a backlight device, with a backlight cover removed.

As illustrated in FIG. 5, a mounting base 131a in a plate shape is formed inside the end portion on the upper side Z1 of the backlight housing 131. The mounting base 131a is a portion on which the display unit 132 and the heat dissipation portion 134 are placed in the backlight housing 131. The mounting base 131a is formed with a first opening portion 131b (opening portion) and a second opening portion 131c that penetrate the mounting base 131a in the plate thickness direction.

The first opening portion 131b is formed in a central portion of the mounting base 131a. The shape and the size of the first opening portion 131b are substantially the same as the shape and the size of a display area 132a of the display unit 132 explained later. As described above, the backlight housing 131 is formed with the first opening portion 131b that is open toward the upper side Z1. The upper side Z1 is one side in the optical axis direction of light emitted by the light source. Specifically, the backlight housing 131 is open toward one side in the optical axis direction of light emitted by the light source.

The second opening portion 131c is an opening in which resin springs 136 are arranged. As illustrated in FIG. 5, the second opening portion 131c is provided on each of the front side X1 and the rear side X2 of the first opening portion 131b, extends in the width direction Y.

The light source is, for example, a light emitting diode (LED). The light source is implemented on a print circuit board, not illustrated, attached to the bottom surface of the backlight housing 131, and is configured to be oriented toward the upper side Z1 to emit light toward that direction.

As illustrated in FIG. 4, the display unit 132 is a liquid crystal panel in a rectangular plate shape that is disposed in the upper portion of the backlight housing 131 near the first opening portion 131b. In the present embodiment, the display unit 132 is formed into a rectangular plate shape having a larger area than the area of the first opening portion 131b described above, and situated on the upper side Z1 of the first opening portion 131b. The display unit 132 is fixed to the backlight housing 131 such that the display unit 132 is sandwiched in the front-and-rear direction X by the resin springs 136 serving as the first fixing portion. As illustrated in FIG. 4, the display unit 132 is inclined in the display unit angle direction d such that the display unit 132 is slightly situated on the lower side Z2 toward the front side X1. The display area 132a is provided in the central portion of the display unit 132, on which light emitted by the light source is focused. The display area 132a is a portion that converts the light of the light source that passes therethrough into display light L representing the display image, and the shape and size of the display area 132a are formed to be approximately the same as the shape and size of the first opening portion 131b.

The optical lenses 133 is a member that focuses the light emitted by the light source toward the display area 132a, and two optical lens 133 are provided between the light source and the display unit 132, and as illustrated in FIG. 4, they are placed to overlap in the up-and-down direction Z.

The heat dissipation portion 134 is a portion that dissipates heat generated within the backlight housing 131, and is made of plate glass in a rectangular plate shape that has a larger area than the area of the first opening portion 131b, and is placed on the lower side Z2 of the display unit 132, as illustrated in FIG. 4. Specifically, on the lower side Z2 of the display unit 132, the heat dissipation portion 134 is placed on the mounting base 131a of the backlight housing 131. As described above, the heat dissipation portion 134 is arranged in proximity to the first opening portion 131b of the backlight housing 131. Here, in particular, heat may be generated by conductive heat caused in the display unit 132 by voltage application during startup of the display apparatus 1, focused-light heat caused when the light of the light source is focused on the display unit 132, or focused-light heat of external light that enters from the emission port P1 to the inside of the backlight housing 131, and as a result, the temperature of the display unit 132 may rise. However, heat dissipation by the heat dissipation portion 134 alleviates the temperature rise of the display unit 132.

Note that in the present embodiment, the heat dissipation portion 134 is arranged on the lower side Z2 of the display unit 132, but the heat dissipation portion 134 may be placed on the upper side Z1 of the display unit 132. That is, the heat dissipation portion 134 can be arranged on one side or the other side of the plate thickness direction of the display unit 132. Further, the heat dissipation portion 134 does not necessarily have to be plate glass, but can be formed using various materials as long as it is a transparent member or a transparent member with heat dissipation property.

The resin springs 136 are fixing members that fix the display unit 132 to the backlight housing 131. As illustrated in FIG. 5, the resin springs 136 are arranged within the second opening portion 131c of the backlight housing 131. Specifically, the resin springs 136 are provided in the second opening portion 131c on the front side X1 and in the second opening portion 131c on the rear side X2 to form pairs, and two pairs of resin springs 136 are provided in the width direction Y of the backlight housing 131. As illustrated in FIG. 5, each of the resin springs 136 include a spring portion 1361 bent inward of the backlight housing 131 and a resin holding portion 1362 provided at the tip of the spring portion 1361.

The spring portion 1361 is a leaf spring that can be elastically deformed in the front-and-rear directions X, and is provided so as to come into contact with the peripheral edges of the display unit 132 and the heat dissipation portion 134. Specifically, the spring portions 1361 on the front side X1 curve inward from the inner wall on the front side X1 of the backlight housing 131, and come into contact with the edge portions on the front side X1 of the display unit 132 and the heat dissipation portion 134. The spring portions 1361 on the rear side X2 curve inward from the inner wall on the rear side X2 of the backlight housing 131, and come into contact with the edge portions on the rear side X2 of the display unit 132 and the heat dissipation portion 134.

The resin holding portions 1362 are portion that press the display unit 132 sandwiched in the front-and-rear direction X between the resin holding portions 1362 toward the inside of the backlight housing 131, and as illustrated in FIGS. 4 and 5, provided at the tips of the spring portions 1361 and are formed into a claw shape so as to catch the edge portion of the display unit 132. In other words, the resin holding portions 1362 are arranged on the peripheral edge of the display unit 132. With the resin springs 136 thus configured, the display unit 132 and the heat dissipation portion 134 are sandwiched and fixed in the display unit angle direction d explained above (i.e., the plane extension direction of the display unit 132).

The backlight cover 137 is a metal cover member that covers the peripheral edge of the display unit 132 and the heat dissipation portion 134 and that fits into the backlight housing 131. The backlight cover 137 and the buffer members 138 constitute a second fixing portion. As illustrated in FIGS. 3 and 4, the backlight cover 137 fits into the backlight housing 131 so as to cover an opening end portion on the upper side Z1 of the backlight housing 131. A first opening 137a opening in the plate thickness direction is formed in the central portion of the backlight cover 137. The position where the first opening 137a is formed corresponds to the position of the display area 132a of the display unit 132 and the positions of the resin springs 136 on the front side X1. Accordingly, when the backlight cover 137 is fitted into the backlight housing 131, the surface on the upper side Z1 of the display area 132a and the resin springs 136 on the front side X1 are exposed to the space inside the housing 11.

A second opening 137b that opens in the plate thickness direction is formed around the first opening 137a. The positions where second openings 137b are formed correspond to the positions of the resin springs 136 on rear side X2. Specifically, in association with the resin springs 136 on the rear side X2, second openings 137b are formed at two locations. Accordingly, when the backlight cover 137 is fitted into the backlight housing 131, the resin springs 136 on the rear side X2 are exposed in the space inside the housing 11.

Figure 6A:
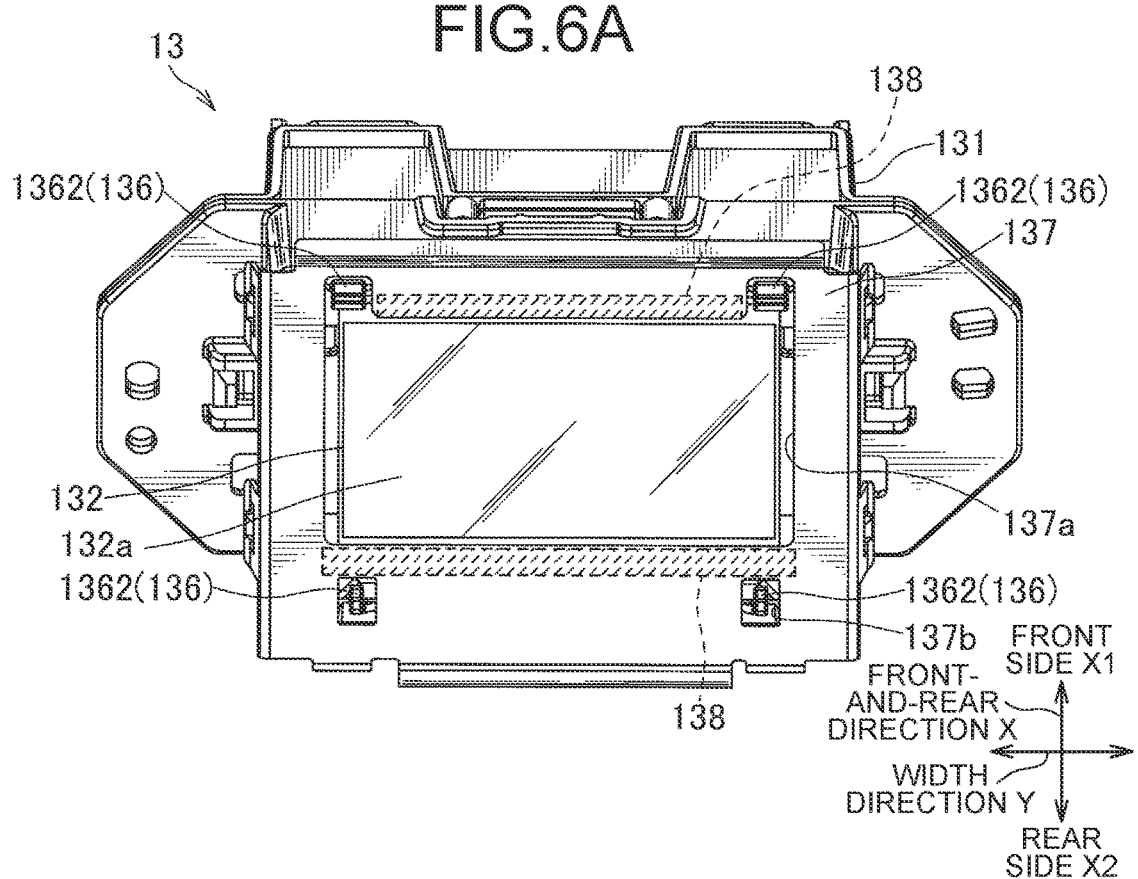
FIG. 6A is a view illustrating arrangement of a buffer member.

As illustrated in FIG. 6A, the buffer members 138 are pasted on the surface, on the lower side Z2, of the backlight cover 137. That is, the backlight cover 137 holds the buffer members 138.

The buffer members 138 are members that press the display unit 132 and the heat dissipation portion 134 together in the buffer member push direction c. The buffer members 138 and the backlight cover 137 explained above constitute the second fixing portion. The buffer members 138 can be made of elastic packing or the like. Furthermore, the buffer members 138 may be made of a thermal sheet or the like having excellent heat dissipation property, and thereby a heat dissipation function for dissipating the heat generated in the display unit 132 may be added to the buffer members 138. As illustrated in FIG. 6A, the buffer members 138 extends in the width direction Y of the backlight housing 131 along the edge portion on the front side X1 of the display area 132a of the display unit 132. The buffer members 138 extends in the width direction Y of the backlight housing 131 along the edge portion on the rear side X2 of the display area 132a. In other words, the buffer members 138 extend along the peripheral edge of the display area 132a of the display unit 132.

As illustrated in FIG. 4, when the backlight cover 137 fits in the backlight housing 131, the buffer members 138 come into contact with the plate surface on the upper side Z1 of the display unit 132, and press the display unit 132 and the heat dissipation portion 134 together in the buffer member push direction c (plate thickness direction). Accordingly, the display unit 132 and the heat dissipation portion 134 are pushed against and fixed to the mounting base 131a explained above. In other words, the backlight cover 137 and the buffer members 138 serving as the second fixing portion press the display unit 132 and the heat dissipation portion 134 together in the buffer member push direction c so as to limit the displacement of the display unit 132 and the heat dissipation portion 134. At this occasion, when the buffer members 138 have the heat dissipation function, the buffer members 138 dissipate heat generated in the display unit 132 to the outside of the backlight housing 131 through the display unit 132 that is in contact therewith.

The control circuit board 14 is a circuit board that controls the display apparatus 1, and is arranged inside the display apparatus 1 (for example, inside the housing 11 in the present embodiment, as illustrated in FIG. 2). The control circuit board 14 controls the lighting pattern of the light source and the operation of the display area 132a explained above.

In the present embodiment, the heat dissipation portion 134 is placed on the lower side Z2 of the display unit 132 to cause the buffer members 138 to come into contact with the display unit 132, but as described above, the heat dissipation portion 134 may be placed on the upper side Z1 of the display unit 132. In this case, when the backlight cover 137 is fitted into the backlight housing 131, the buffer members 138 are in contact with the plate surface on the upper side Z1 of the heat dissipation portion 134 presses the heat dissipation portion 134 and the display unit 132 together in the buffer member push direction c (plate thickness direction). When the buffer members 138 have the heat dissipation function, the heat generated in the display unit 132 is dissipated to the outside of the backlight housing 131 through the heat dissipation portion 134 that is in contact therewith.

According to the present embodiment, the display unit 132 and the heat dissipation portion 134 can be sandwiched and fixed by the resin springs 136 (first fixing portion) in the display unit angle direction d (plane extension direction). In addition, the backlight cover 137 and the buffer members 138 (second fixing portion) can press the display unit 132 and the heat dissipation portion 134 in the buffer member push direction c (plate thickness direction) to limit displacement of the display unit 132 and the heat dissipation portion 134. That is, the display unit 132 and the heat dissipation portion 134 can be fixed from at least two directions by fixing members having different fixing structures. Therefore, the structure around the display unit 132 is difficult to displace, and even if the backlight housing 131 vibrates, the vibration of the display unit 132 and the heat dissipation portion 134 can be alleviated, and the generation of abnormal noise can be prevented. Furthermore, since the display unit 132 and the heat dissipation portion 134 can be prevented from losing constant contact with each other due to vibration, the heat dissipation efficiency of the heat dissipation portion 134 can be stably maintained. Furthermore, according to this configuration, the thickness of the heat dissipation portion 134 can be easily ensured, the heat dissipation property of the heat dissipation portion 134 can be improved. Therefore, the display apparatus with improved heat dissipation performance and vibration resistance can be obtained.

According to the present embodiment explained above, the buffer members 138 constituting the second fixing portion may include a heat dissipation function. In this case, the heat generated in the display unit 132 can be dissipated by not only the heat dissipation portion 134 (heat dissipation portion) arranged on one side or the other side, in the plate thickness direction, of the display unit 132 but also the backlight cover 137 and the buffer members 138 (second fixing portion). Accordingly, the rise in the temperature of the display unit 132 can be alleviated, and expansion or damage of the display unit 132 can be avoided.

Furthermore, because the heat in the backlight housing 131 can also be dissipated by the backlight cover 137 and the buffer members 138, it is not necessary to increase the thickness of the heat dissipation portion 134 for heat dissipation, as compared with a configuration without the backlight cover 137 and the buffer members 138 and a configuration in which the buffer members 138 do not have the heat dissipation function. Therefore, the increase in the size of the display apparatus 1 can be alleviated, and the increase in the manufacturing cost of the display apparatus 1 can be alleviated.

Furthermore, the heat dissipation portion 134 is a transparent member or a transparent member with heat dissipation property (in the present embodiment, plate glass). In this case, the heat dissipation portion 134 does not block the light emitted by the light source, and therefore, the heat dissipation portion can be placed overlappingly throughout the display unit 132. Accordingly, the heat dissipation property of the display apparatus 1 can be further improved.

Furthermore, in the present embodiment, the first fixing portion can be configured with a simple structure in which the pairs of resin springs 136, i.e., the pairs of leaf springs, are arranged on the backlight housing 131, so that manufacturing of the display apparatus 1 can be facilitated.

Furthermore, in the present embodiment, the backlight cover 137 (cover member) holds the buffer members 138. Therefore, by fitting the backlight cover 137 to the backlight housing 131, the buffer members 138 are brought into contact with either the display unit 132 or the heat dissipation portion 134, so that heat can be dissipated from this contact portion.

Figure 6B:
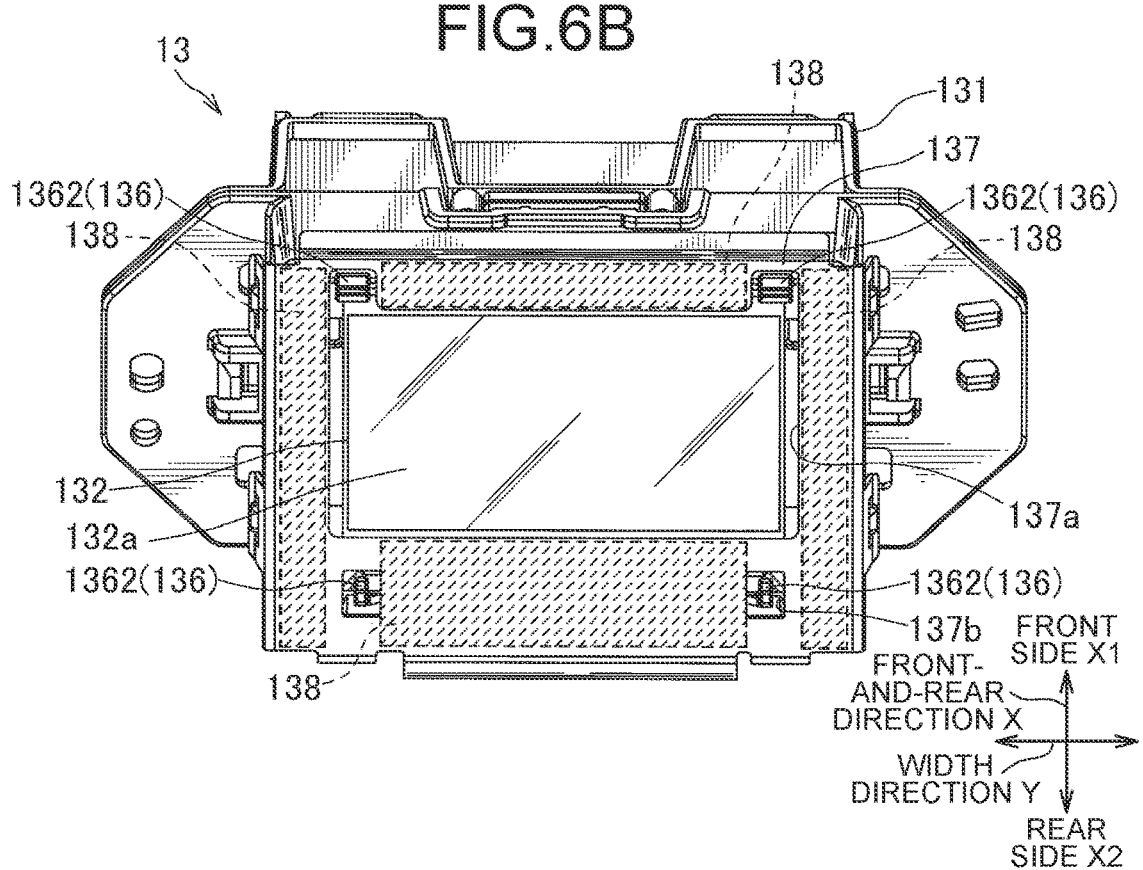
FIG. 6B is a view illustrating arrangement of a buffer member according to a modified embodiment.

Although one embodiment of the present invention has been described above in detail with reference to the drawings, the specific structure is not limited to the embodiment, and design changes that do not depart from the gist of the present invention are also included in the present invention, even if such design changes exist. FIG. 6B is a view illustrating arrangement of buffer members 138 according to a modified embodiment. In this modified embodiment, the buffer members 138 are arranged along not only the edge portion on the front side X1 and the edge portion of the rear side X2 of the display area 132a of the display unit 132 but also an edge portion on one side and an edge portion on the other side, in width direction Y, of the display area 132a.

According to such configuration, the entire peripheral edge of the display area 132a can be surrounded by the buffer members 138, and therefore, the heat dissipation performance and vibration resistance of the display apparatus 1 can be further improved.

Figure 7:
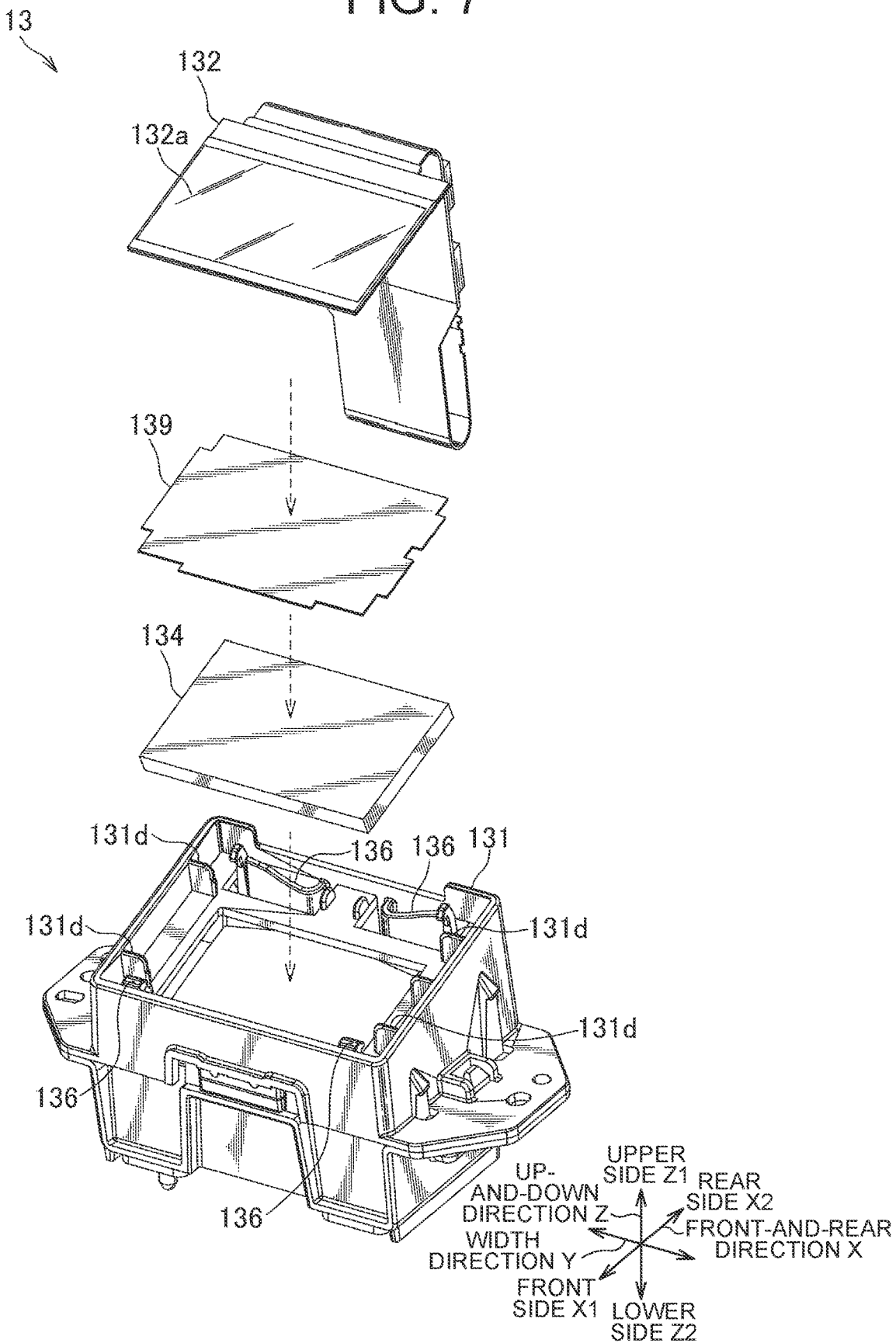
FIG. 7 is an exploded perspective view of a backlight device according to a modified embodiment.

Furthermore, according to the embodiment explained above, displacement of the display unit 132 and the heat dissipation portion 134 is limited by the resin springs 136 (first fixing portion), the backlight cover 137, and the buffer members 138 (second fixing portion). However, the fixing structure of the display unit 132 and the heat dissipation portion 134 is not limited thereto. For example, as illustrated in FIG. 7, at least one pair (two pairs in FIG. 7) of fixed ribs 131d (third fixing portion) protruding inward in the width direction Y may be provided on the inner peripheral surface of the backlight housing 131, and the display unit 132 and the heat dissipation portion 134 may be press-fitted between the fixed ribs 131d. In other words, the fixed ribs 131d may be provided on the inner peripheral surface of the backlight housing 131 to protrude inwardly in a direction that is different from the direction in which the resin springs 136 sandwich the display unit 132 and the heat dissipation portion 134 within the plane extension direction, and the fixed ribs 131d may be adopted as a third fixing portion.

According to such configuration, not only fixing with the resin springs 136 (first fixing portion), the backlight cover 137, and the buffer members 138 (second fixing portion) but also press-fit fixing into the fixed ribs 131d (third fixing portion) can be used as fixing means of the display unit 132 and the heat dissipation portion 134. Therefore, vibrations in the plane extension direction and plate thickness direction of the display unit 132 and the heat dissipation portion 134 can be further reduced, and generation of abnormal noises can be prevented.

Furthermore, in the embodiment described above, the display unit 132 and the heat dissipation portion 134 are arranged to directly overlap in the up-and-down direction Z. However, the display unit 132 and the heat dissipation portion 134 do not necessarily need to directly overlap with each other. FIG. 7 is an exploded perspective view of a backlight device 13 according to a modified embodiment. In this modified embodiment, a diffusion plate 139 is arranged between the display unit 132 and the heat dissipation portion 134. As illustrated FIG. 8B, the diffusion plate 139 is formed in the form of a thin sheet, of which plate surface is formed with unevenness. According to this configuration, a thin air layer is formed between the display unit 132 and the heat dissipation portion 134 due to air accumulated in spaces between recessed portions and protruding portions and in recessed portion of the diffusion plate 139.

Figure 8C:
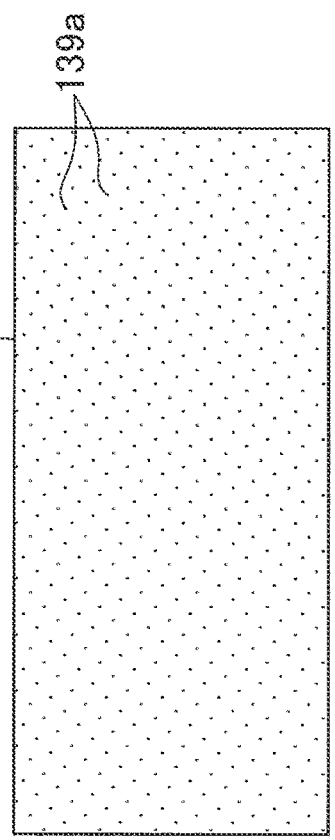
FIG. 8C is a view illustrating dots of the diffusion plate.
Figure 8A:
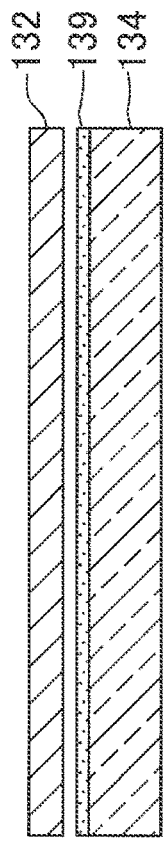
FIG. 8A is a side view of a display unit, a diffusion plate, and a heat dissipation portion.
Figure 8B:
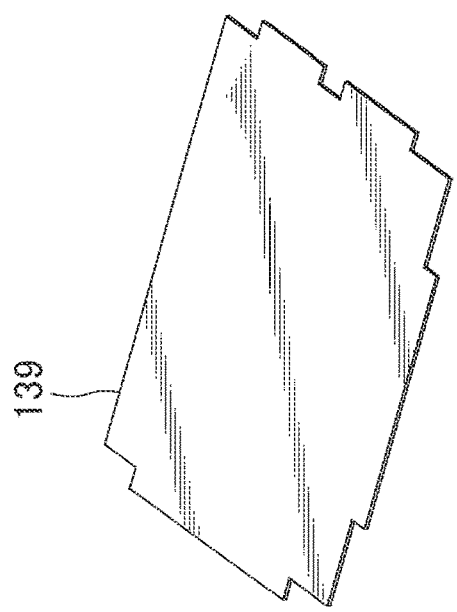
FIG. 8B is a perspective view illustrating the diffusion plate.

In this case, the surfaces of the display unit 132 and the heat dissipation portion 134 that are in contact with each other are generally smooth, adhesion may occur between the surfaces that are in contact with each other, and interference fringes may occur. Depending on the degree of occurrence of interference fringes, this may lead to display defects in the HUD unit. However, according to this modified embodiment, the diffusion plate 139 with unevenness can form an air layer between the display unit 132 and the heat dissipation portion 134. Therefore, contact between the display unit 132 and the heat dissipation portion 134 can be alleviated by the air layer, and generation of interference fringes can be avoided. Even if the diffusion plate 139 is arranged in this way, the air layer due to the unevenness of the diffusion plate 139 and the diffusion plate 139 is thin. Therefore, the fixing state of the display unit 132 and the heat dissipation portion 134 can be stably maintained by the resin springs 136, the backlight cover 137, the buffer members 138, and the fixed ribs 131d described above. Therefore, the display apparatus 1 that avoids interference fringes and has improved heat dissipation performance and vibration resistance can be obtained. The unevenness provided on the diffusion plate 139 can be set as appropriate, and for example, as illustrated in FIG. 8C, unevenness may be provided on the diffusion plate 139 by forming minute dots 139a on the diffusion plate 139. According to this configuration, a thin air layer can be formed between the display unit 132 and the heat dissipation portion 134 by the air accumulated between the dots 139a.

LIST OF REFERENCE SIGNS

C buffer member push direction (plate thickness direction)
d display unit angle direction (plane extension direction)
131 backlight housing (housing)
132 display unit
132a display area
134 heat dissipation portion
136 resin spring (first fixing portion)
137 backlight cover (cover member)
138 buffer member (second fixing portion)

What is claimed is:

1. A display apparatus comprising:
a light source;
a display unit in a plate shape including a display area on which light emitted by the light source is focused;
a heat dissipation portion in a plate shape arranged on one side or another side in a plate thickness direction of the display unit;
a housing containing the display unit and the heat dissipation portion;
a first fixing portion provided on the housing to come into contact with the display unit and sandwich and fix the display unit and the heat dissipation portion in a plane extension direction intersecting the plate thickness direction; and
a second fixing portion that limits displacement of the display unit and the heat dissipation portion by pressing the display unit and the heat dissipation portion together in the plate thickness direction.

2. The display apparatus according to claim 1, wherein the housing is provided with a third fixing portion at a position of sandwiching the display unit and the heat dissipation portion in a direction that is different from a direction in which the first fixing portion sandwiches the display unit and the heat dissipation portion within the plane extension direction, and
the display unit and the heat dissipation portion are fixed to the third fixing portion by press fitting.

3. The display apparatus according to claim 1, wherein a diffusion plate with unevenness is arranged between the display unit and the heat dissipation portion to form an air layer.

4. The display apparatus according to claim 1, wherein the heat dissipation portion is a transparent member or a transparent member with heat dissipation property.

5. The display apparatus according to claim 1, wherein the first fixing portion is arranged on a peripheral edge of the display unit, and
the first fixing portion is constituted by a pair of leaf springs opposing each other.

6. The display apparatus according to claim 1, wherein the second fixing portion includes a buffer member that extends along a peripheral edge of the display area.

7. The display apparatus according to claim 6, wherein the second fixing portion includes a cover member that holds the buffer member, covers a peripheral edge of the display unit and a peripheral edge of the heat dissipation portion, and fits into the housing,
the housing includes an opening portion that is open toward one side in an optical axis direction of light emitted by the light source,
the display unit and the heat dissipation portion are provided in proximity to the opening portion,
the first fixing portion is provided on the peripheral edge of the display unit, and
with the cover member being fitted in the housing, the buffer member is in contact with one of the display unit and the heat dissipation portion.

* * * * *